(12) United States Patent
Chiang et al.

(10) Patent No.: US 9,892,308 B2
(45) Date of Patent: Feb. 13, 2018

(54) FINGERPRINT RECOGNITION METHODS AND DEVICES

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/624,272

(22) Filed: Feb. 17, 2015

(65) Prior Publication Data

US 2015/0254498 A1 Sep. 10, 2015

(30) Foreign Application Priority Data

Mar. 7, 2014 (TW) .............................. 103107800 A
Jul. 31, 2014 (TW) .............................. 103126149 A

(51) Int. Cl.
| | |
|---|---|
| G06K 9/00 | (2006.01) |
| G06F 17/30 | (2006.01) |
| H04N 7/18 | (2006.01) |
| G06K 9/62 | (2006.01) |

(52) U.S. Cl.
CPC ..... *G06K 9/00087* (2013.01); *G06F 17/3028* (2013.01); *G06K 9/00013* (2013.01); *G06K 9/00026* (2013.01); *G06K 9/6201* (2013.01); *G06K 9/6202* (2013.01); *H04N 7/18* (2013.01)

(58) Field of Classification Search
CPC ..... H04L 2209/24; G06F 21/31; G06F 21/32; G06F 17/3028; G06K 9/00013; G06K 9/00087; G06K 9/001; G06K 9/00026; G06K 9/0008; G06K 9/00093; G06K 9/6201; H04N 7/18
See application file for complete search history.

(56) References Cited

U.S. PATENT DOCUMENTS

| | | | |
|---|---|---|---|
| 5,982,913 A | 11/1999 | Brumbley et al. | |
| 6,289,114 B1 | 9/2001 | Mainguet | |
| 6,459,804 B2 | 10/2002 | Mainguet | |
| 7,190,816 B2 * | 3/2007 | Mitsuyu | G06K 9/00026 382/124 |
| 8,810,367 B2 | 8/2014 | Mullins | |

(Continued)

FOREIGN PATENT DOCUMENTS

| | | |
|---|---|---|
| EP | 1150608 B1 | 12/2004 |
| JP | 2004-355403 | 12/2004 |

(Continued)

OTHER PUBLICATIONS

Taiwan Patent Office, Office Action, Patent Application Serial No. 103126149, dated Sep. 18, 2015, Taiwan.

(Continued)

*Primary Examiner* — Kim Vu
*Assistant Examiner* — Michael Vanchy, Jr.
(74) *Attorney, Agent, or Firm* — JCIPRNET

(57) ABSTRACT

A fingerprint recognition device and method thereof are provided. The fingerprint recognition method includes: obtaining a plurality of swiping frames; generating a plurality of registered fingerprint datasets according to the swiping frames; obtaining a pressing fingerprint dataset; and comparing the pressing fingerprint dataset with the registered fingerprint datasets.

11 Claims, 6 Drawing Sheets

(56) References Cited

U.S. PATENT DOCUMENTS

| | | | |
|---|---|---|---|
| 2003/0126448 A1* | 7/2003 | Russo | G06K 9/00026 713/186 |
| 2003/0194114 A1* | 10/2003 | Mitsuyu | G06K 9/00026 382/124 |
| 2005/0169503 A1* | 8/2005 | Howell | G06F 3/011 382/115 |
| 2005/0238211 A1* | 10/2005 | Du | G06K 9/00026 382/124 |
| 2008/0049987 A1* | 2/2008 | Champagne | G06K 9/00026 382/124 |
| 2009/0067679 A1* | 3/2009 | Mainguet | G06K 9/00026 382/115 |
| 2012/0076370 A1* | 3/2012 | Lei | G06K 9/00026 382/125 |
| 2012/0268246 A1* | 10/2012 | Liu | G06F 21/32 340/5.82 |
| 2012/0308092 A1 | 12/2012 | Benkley et al. | |
| 2013/0076485 A1* | 3/2013 | Mullins | G06F 21/32 340/5.83 |
| 2013/0329967 A1* | 12/2013 | Abiko | G06K 9/00026 382/115 |
| 2014/0003678 A1 | 1/2014 | Vieta et al. | |
| 2014/0003679 A1 | 1/2014 | Han et al. | |
| 2014/0003681 A1 | 1/2014 | Wright et al. | |
| 2014/0199966 A1 | 7/2014 | Schushan | |
| 2014/0212010 A1 | 7/2014 | Han et al. | |
| 2014/0267659 A1 | 9/2014 | Lyon et al. | |

FOREIGN PATENT DOCUMENTS

| | | |
|---|---|---|
| JP | 2010-277315 | 12/2010 |
| TW | I298852 | 7/2008 |
| WO | WO 2010/061900 | 6/2010 |

OTHER PUBLICATIONS

James W. Osterburg et al., "Development of a Mathematical Formula for the Calculation of Fingerprint Probabilities Based on Individual Characteristics," Journal of the American Statistical Association, Dec. 1977, pp. 772-778, vol. 72, No. 360, US.

Jeong-Woo Lee et al. "A 600-dpi Capacitive Fingerprint Sensor Chip and Image-Synthesis Technique," IEEE Journal of Solid-State Circuits, pp. 469-475, vol. 34, No. 4, Apr. 1999, IEEE, US.

Japan Patent Office, Office Action, Patent Application Serial No. 2015-149646, dated Aug. 2, 2016, Japan.

* cited by examiner

FINGERPRINT RECOGNITION METHODS AND DEVICES

CROSS REFERENCE TO RELATED APPLICATIONS

This application claims priority of Taiwan Patent Application No. 103107800 filed on Mar. 7, 2014, and Taiwan Patent Application No. 103126149, filed on Jul. 31, 2014, the entirety of which is incorporated by reference herein.

BACKGROUND OF THE INVENTION

Field of the Invention

The invention generally relates to fingerprint recognition technology, and more particularly, to fingerprint recognition technology for obtaining a plurality of registered fingerprint datasets after a user swipes his/her finger over a fingerprint sensor several times and performing fingerprint recognition by comparing a verifying fingerprint with the registered fingerprint datasets wherein the verifying fingerprint is obtained by the fingerprint sensor while a user presses his/her finger on the fingerprint sensor.

Description of the Related Art

In recent years, biometric recognition technology has developed greatly. Since security codes and access cards may be easily stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

In one conventional method of fingerprint recognition, the user presses his or her finger on the fingerprint sensor several times in order to generate a plurality of registered fingerprint datasets and then presses his or her finger again on the fingerprint sensor for verification. However, for the fingerprint sensor with a small sensing area, in order to obtain sufficient registered fingerprint datasets for recognition, the user needs to press many times so as to complete the fingerprint registration process.

In another conventional method of fingerprint recognition, the user swipes his or her finger over the fingerprint sensor of an electronic device, and the electronic device will obtain a plurality of frames when the user is swiping the finger over the fingerprint sensor. The electronic device will then construct the frames to generate a registered fingerprint dataset. The user may be asked to swipe the finger over the fingerprint sensors several times. Therefore, a plurality of registered fingerprint datasets will be generated accordingly. For verification, the user has to swipe the finger over the fingerprint sensor again, and the electronic device comprising the fingerprint sensor will generate a verifying fingerprint dataset accordingly. The electronic device will compare the verifying fingerprint dataset with the registered fingerprint dataset(s) and then decide whether the verifying fingerprint dataset passes the verification.

BRIEF SUMMARY OF THE INVENTION

A fingerprint recognition method and device thereof are provided to obtain a plurality of registered fingerprint datasets after a user swipes his/her finger over a fingerprint sensor several times and performing fingerprint recognition by comparing a verifying fingerprint with the registered fingerprint datasets wherein the verifying fingerprint is obtained by the fingerprint sensor while a user presses his/her finger on the fingerprint sensor.

An embodiment of the invention provides a fingerprint recognition method. The fingerprint recognition method comprises: obtaining a plurality of swiping frames; generating a plurality of registered fingerprint datasets according to the swiping frames; obtaining a pressing fingerprint dataset; and comparing the pressing fingerprint dataset with the registered fingerprint datasets.

An embodiment of the invention provides a fingerprint recognition device. The fingerprint recognition device comprises a fingerprint sensor and a processing unit. The fingerprint sensor is configured to sense a plurality of swiping frames. The processing unit is configured to generate a plurality of registered fingerprint datasets according to the swiping frames, obtain a pressing fingerprint dataset and compare the pressing fingerprint dataset with the registered fingerprint datasets.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
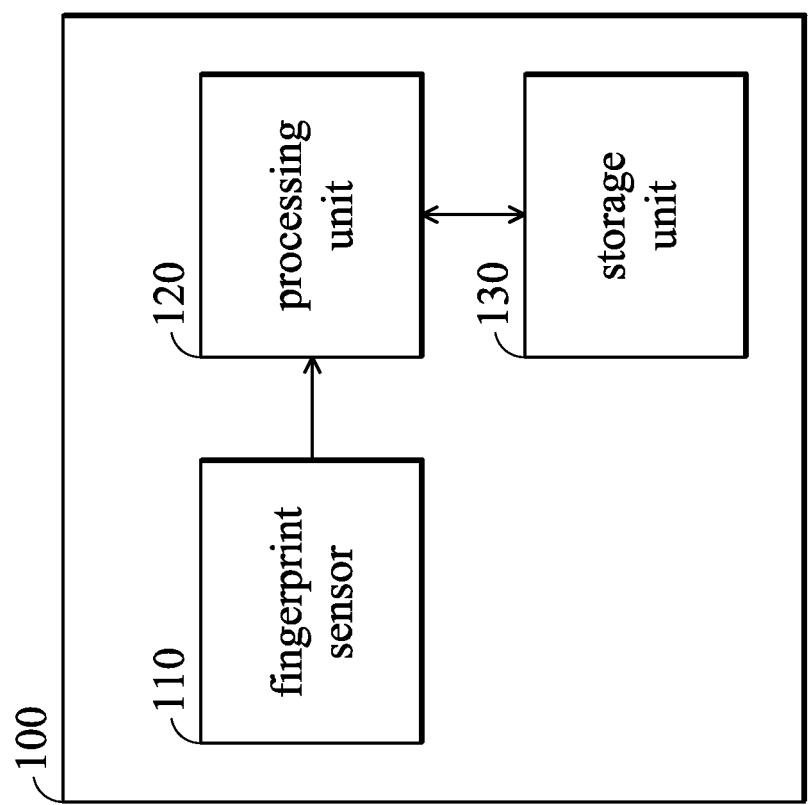
FIG. 1 is an electronic device 100 according to an embodiment of the invention.

FIG. 1 is an electronic device 100 according to an embodiment of the invention. As shown in FIG. 1, the electronic device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In an embodiment of the invention, the fingerprint sensor 110 has a small sensing area of n×m. For example, the sensing area of the fingerprint sensor 110 is 10 mm×4 mm or 6 mm×6 mm. Namely, the sensing area of the fingerprint sensor 110 is small, and the area of the frames which are sensed by the fingerprint sensor 110 while the user is swiping or pressing his or her finger over or on the fingerprint sensor will be small too since the area of the frame is equal to the sensing area of the fingerprint sensor 110. The frame is small, and therefore, each frame comprises few minutiae (e.g. fewer than 5 minutiae).

In an embodiment of the invention, when registering a fingerprint, the user may swipe his or her finger over the fingerprint sensor 110 several times (i.e. 3~4 times). After each time of the user's finger swiping over the fingerprint sensor 110, the electronic device 100 will obtain a plurality of swiping frames and the processing unit 120 will select a plurality of effective frames from the swiping frames. Namely, the number of the effective frames is smaller than that of the swiping frames. The effective frames will form a registered fingerprint dataset. In an embodiment of the invention, after the processing device 120 has selected the registered fingerprint dataset, the registered fingerprint dataset will be stored in the storage unit 130. After the user swipes his or her finger over the fingerprint sensor 110 several times (i.e. 3~4 times), a plurality of registered fingerprint datasets will be stored in the storage unit 130.

In an embodiment of the invention, in order to register a fingerprint, the user will be asked to swipe his or her finger over the fingerprint sensor 110 four times along four different directions. For example, the user will be asked to swipe his or her finger four times along four different directions of (1) from upper to lower (or vise-versa), (2) from left to right (or vise-versa), (3) from upper-left to lower-right (or vise-versa) and (4) from upper-right to lower-left (or vise-versa). By asking the user to swipe the finger along the four different directions, four registered fingerprint datasets will be generated and each of the registered fingerprint datasets is corresponding to one of the four different directions.

In order to verify a fingerprint, in an embodiment of the invention, the user will be asked to press his or her finger on the fingerprint sensor 110. One frame of fingerprint data will be sensed by the fingerprint sensor 110. The frame of fingerprint data forms a verifying fingerprint dataset. Since the four registered fingerprint datasets are respectively corresponding to the directions of (1) from upper to lower (or vise-versa), (2) from left to right (or vise-versa), (3) from upper-left to lower-right (or vise-versa) and (4) from upper-right to lower-left (or vise-versa), the rotation between the verifying fingerprint dataset and one of the registered fingerprint dataset will be less than 22.5 degrees. Therefore, during fingerprint recognition, no matter in which direction the user presses his or her finger on the fingerprint sensor 110, the rotation between the verifying fingerprint dataset and one of the registered fingerprint datasets will be less than 22.5 degrees and therefore, is tolerable for fingerprint recognition.

In an embodiment of the invention, after obtaining a plurality of swiping frames sensed by the fingerprint sensor 110 during the user's swiping the finger over the fingerprint sensor 110, the processing unit 120 will select a number of effective frames from the swiping frames to form a registered fingerprint dataset. After the user swipes his or her finger over the fingerprint sensor 110 four times respectively along four different directions, four registered fingerprint datasets corresponding to the four different directions will be generated. The processing unit 120 will generate an array to represent each of the registered fingerprint dataset according to the selected frames included in the registered fingerprint dataset. In one embodiment of the invention, each array is indicated as $S_i = \{F^i_1, F^i_2, F^i_N\}$, wherein i indicates the i-th time of the user's swiping the finger over the fingerprint sensor 110. In the case of asking the user to swipe the finger over the fingerprint sensor 110 four times for fingerprint registration, the range of i is 1≤i≤4. $F^i_N$ indicates an effective frame included in the registered fingerprint dataset. In an embodiment of the invention, when the number of the effective frames for one registered fingerprint dataset is smaller than a default value, the processing unit 120 will determine that the registered fingerprint dataset is ineffective and will discard it.

Figure 2:
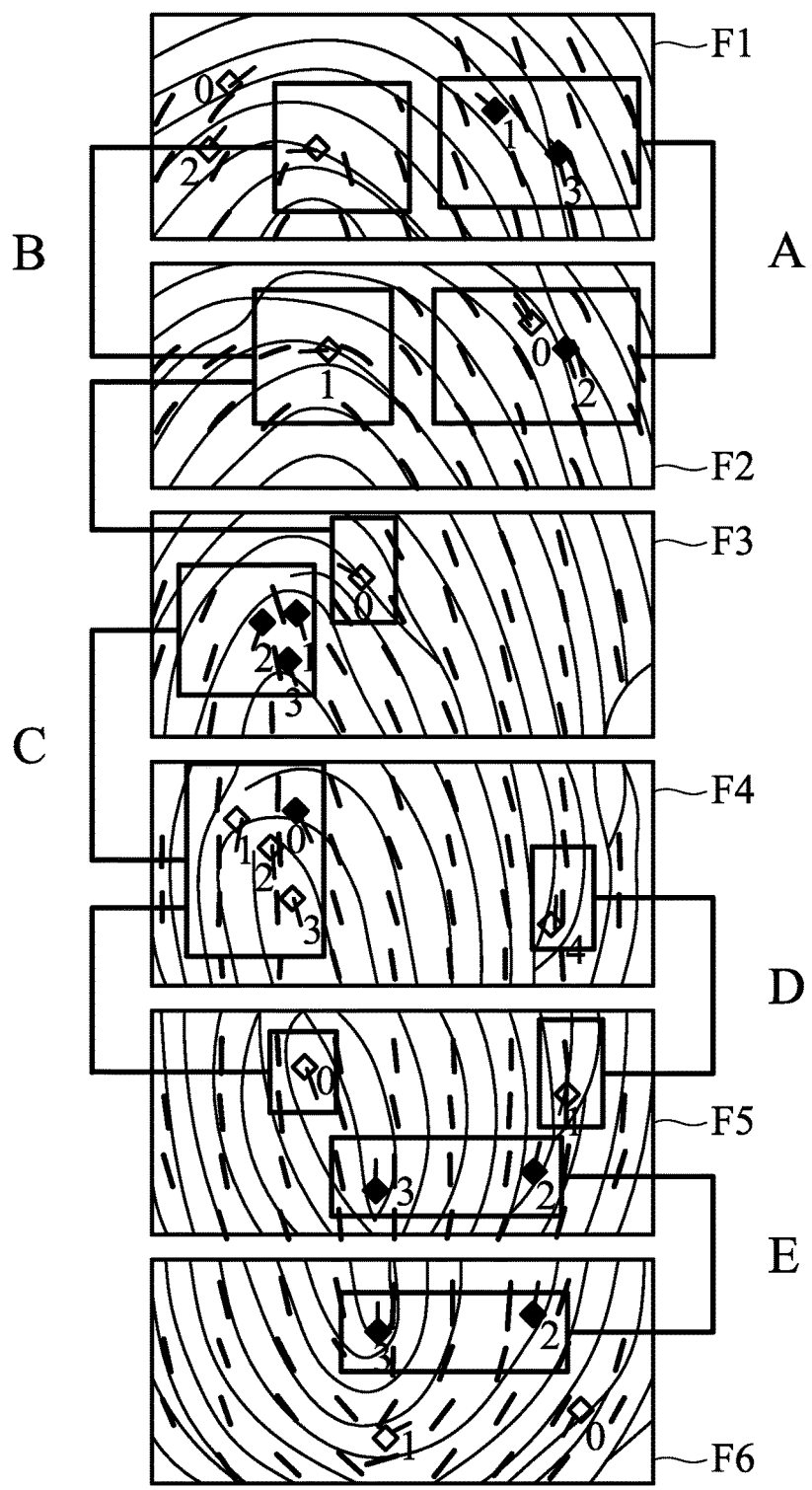
FIG. 2 is a schematic diagram illustrating selection of the effective frames according to an embodiment of the invention.

In an embodiment of the invention, the processing unit 120 selects the effective frames by comparing the minutiae of the swiping frames sensed by the fingerprint sensor 110 during the user's swiping the finger over the fingerprint sensor 110. In the embodiment, the processing unit 120 may identify a number of groups of minutiae in each of the swiping frames, and then compare the swiping frames in sequence by determining whether a specific group of minutiae repeatedly appears in a number of continuous swiping frames. FIG. 2 will illustrate an example of the embodiment.

FIG. 2 is a schematic diagram illustrating the selection of the effective frames according to an embodiment of the invention. For illustration, it is assumed that six swiping frames F1~F6 are sensed and generated after the user swipes his or her finger over the fingerprint sensor 110. As shown in FIG. 2, the processing unit 120 will identify a number of groups of minutiae included in each of frames F1~F6. The identified groups of minutiae are Groups A~E. Group A appears in frames F1 and F2. Group B appears in frames F1, F2 and F3. Group C appears in frames F3, F4 and F5. Group D appears in frames F4 and F5. Group E appears in frames F5 and F6. Then the processing unit 120 will compares the frames F1~F6 in sequence to determine whether a specific group of minutiae repeatedly appears in several continuous frames. As mentioned, Group A appears in frames F1 and F2 while Group B appears in frames F1, F2 and F3. Since the set of frames F1 and F2 is a subset of that of frames F1, F2 and F3, the processing unit 120 will initiate the selection process by analyzing Group B. The processing unit 120 determines that frames F1, F2 and F3 are overlapped while frame F1 and frame F4 are not overlapped since Group B repeatedly appears in frames F1, F2 and F3, but not in frame F4. Namely, frame F1 and F3 are overlapped, and among the overlapped frames comprising Group B, the distance between frame F1 and frame F3 is the farthest. Therefore, the processing unit 120 will select frame F1 and frame F3 as the effective frames to be included into the registered fingerprint dataset. Then, the processing unit 120 will analyze Group C and determine that frames F3, F4 and F5 are overlapped while frame F3 and frame F6 are not overlapped since Group C repeatedly appears in frames F3, F4 and F5, but not in frame F6. Namely, frame F3 and F5 are overlapped, and among the overlapped frames F3, F4 and F5 comprising Group C, the distance between frame F3 and frame F5 is the farthest. Therefore, the processing unit 120 will further select the frame F5 to be an effective frame, and the frame F5 will also be included into the registered fingerprint dataset (F3 has been selected and included). Since the set of frames F4 and F5 is a subset of that of frames F3, F4 and F5, the processing unit 120 will continue the selection process by analyzing Group E without analyzing Group D. The processing unit 120 will analyze Group E and determine that frames F5 and F6 are overlapped while frame F4 and frame F6 are not overlapped since Group E repeatedly appears in frames F5 and F6, but not in frame F4. Therefore, the processing unit 120 will further select the frame F5 to be an effective frame, and the frame F5 will also be included into the registered fingerprint dataset (F5 has been selected and included). Therefore, after analyzing Groups A~E, the processing unit 120 will select frames F1, F3 and F5 as the effective frames to be included into the registered fingerprint dataset to make the registered fingerprint dataset can comprise Groups A~E. Note that the embodiment is only for specifying the invention and it is to be understood that the invention is not limited thereto. The processing unit 120 may select a plurality of frames as the effective frames to be included into the registered fingerprint dataset according to different conditions of minutiae of sensed swiping frames.

Figure 3:
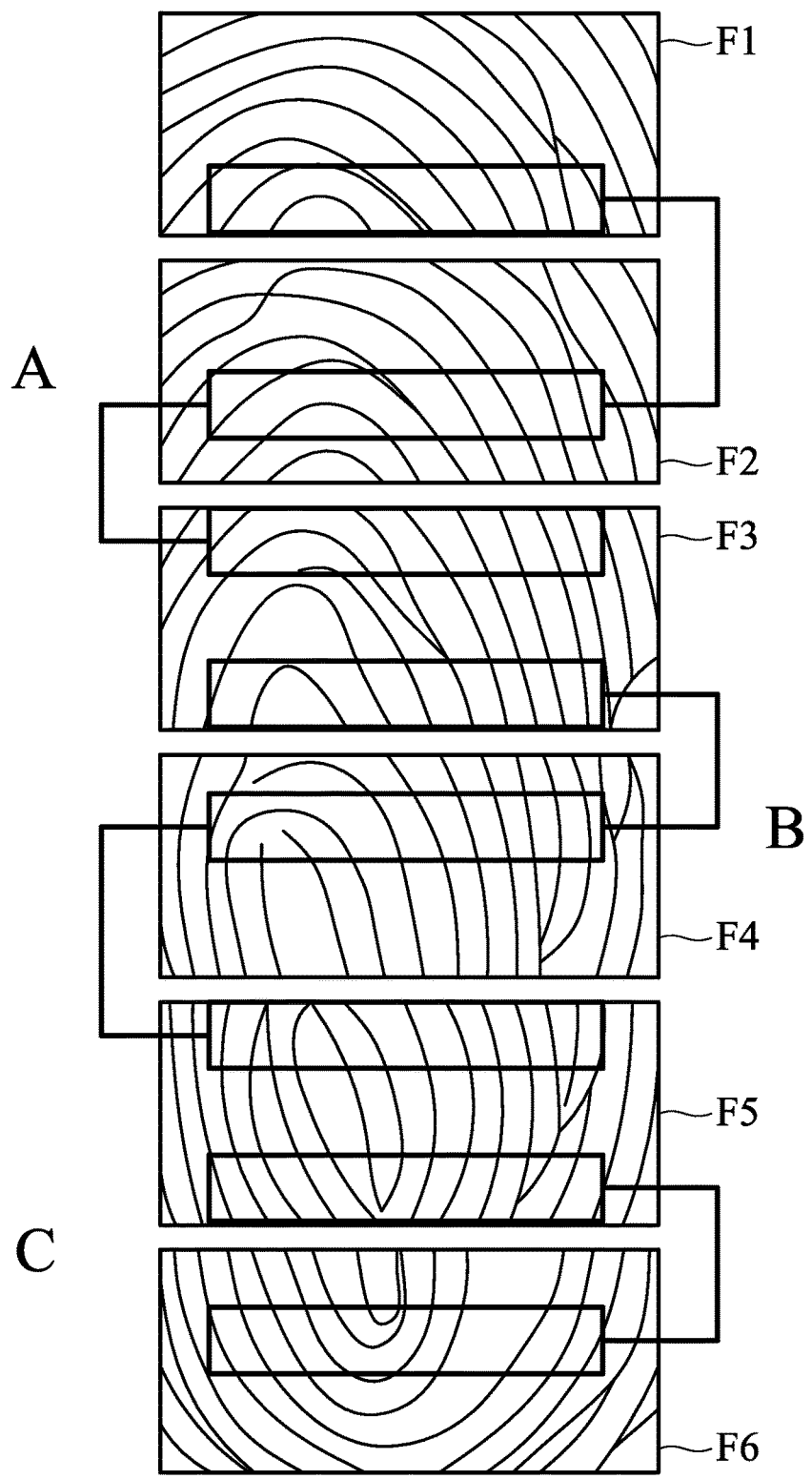
FIG. 3 is a schematic diagram illustrating the selection of the effective frames according to another embodiment of the invention.

In another embodiment of the invention, the processing unit 120 selects effective frames by comparing the reference areas included in the swiping frames which are sensed and obtained during the user's swiping the finger over the fingerprint sensor 110. In the embodiment, the processing unit will identify a plurality of reference areas which are included in the swiping frames. The processing unit 120 will then sequentially compare the swiping frames to determine whether a specific reference area repeatedly appears in a number of continuous swiping frames, and select the effective frames to be included into the registered fingerprint dataset according to the comparison results. FIG. 3 will illustrate an example of the embodiment.

FIG. 3 is a schematic diagram illustrating selection of the effective frames according to another embodiment of the invention. For illustration, it is assumed that six swiping frames F1~F6 are sensed and generated after the user swipes his or her finger over the fingerprint sensor 110. As shown in FIG. 3, the processing unit 120 will identify the reference areas $R_A$~$R_C$ which are included in the swiping frames F1~F6. Reference area $R_A$ appears in frames F1, F2 and F3, and does not appear in frame F4. Reference area $R_B$ appears in frames F3, F4 and F5, and does not appear in frame F6. Reference area $R_C$ appears in frames F5 and F6. Then, the processing unit 120 will compare the frames F1~F6 in sequence to determine whether a specific reference area repeatedly appears in several continuous frames, and select the effective frames to be included into the registered fingerprint dataset according to the comparison results. The processing unit 120 will initiate the selection process by analyzing reference area $R_A$, and determine that frames F1, F2 and F3 are overlapped while frame F1 and frame F4 are not overlapped since reference area $R_A$ repeatedly appears in frames F1, F2 and F3, but not in frame F4. Namely, frame F1 and F3 are overlapped, and among the overlapped frames F1, F2 and F3 comprising reference area $R_A$, the distance between frame F1 and frame F3 is the farthest. Therefore, the processing unit 120 will select frame F1 and frame F3 as the effective frames to be included into the registered fingerprint dataset. Then, the processing unit 120 will analyze reference area $R_B$, and determine that frames F3, F4 and F5 are overlapped while frame F3 and frame F6 are not overlapped since reference area $R_B$ repeatedly appears in frames F3, F4 and F5, but not in frame F6. Namely, frame F3 and F5 are overlapped, and among the overlapped frames F3, F4 and F5 comprising reference area $R_B$, the distance between frame F3 and frame F5 is the farthest. Therefore, the processing unit 120 will further select the frame F5 to be an effective frame, and the frame F5 will also be included into the registered fingerprint dataset (F3 has been selected and included). Then, the processing unit 120 will analyze reference area $R_C$, and determine that frames F5 and F6 are overlapped since reference area $R_C$ repeatedly appears in frames F5 and F6. Therefore, the processing unit 120 will further select the frame F5 (F5 has been selected and included) to be an effective frame, and the frame F5 will also be included into the registered fingerprint dataset. Therefore, after analyzing reference areas $R_A$~$R_C$, the processing unit 120 will select frames F1, F3 and F5 as the effective frames to be included into the registered fingerprint dataset to make the registered fingerprint dataset comprise reference areas $R_A$~$R_C$. Note that the embodiment is only for specifying the invention and it is to be understood that the invention is not limited thereto. The processing unit 120 may select a plurality of frames as the effective frames to be included into the registered fingerprint dataset according to different conditions of reference areas of sensed swiping frames.

In another embodiment of the invention, the electronic device 100 further comprises a prompting unit (not shown in figures). When the user swipes his or her finger over the fingerprint sensor 110, the fingerprint sensor 110 will sense along which direction or on which location the user swipes his or her finger over the fingerprint sensor 110 to generate sensed information. The prompting unit generates prompting information according to the sensed information obtained by the fingerprint sensor 110. In an embodiment of the invention, the prompting information is provided to the user for indicating the user whether the user swipes his or her finger over the fingerprint sensor 110 along the correct direction and whether the user needs to move his or her finger to a different location. In an embodiment of the invention, the user swipes his or her finger and stops swiping his or her finger temporarily over the fingerprint sensor 110 several times, and a registered fingerprint dataset will be generated accordingly. After the user has swiped his or her finger over the fingerprint sensor 110 along a default distance, the prompting information will be generated to notify the user to temporarily stop swiping his or her finger without his or her finger leaving the fingerprint sensor 110. A plurality of swiping frames will be sensed during that swiping, and a plurality of effective frames will be selected accordingly. Thereafter, the prompting information will notify the user to swipe his or her finger over the fingerprint sensor 110 again. After a default distance, the prompting information will notify the user to stop swiping his or her finger. Another plurality of effective frames will be selected from the swiping frames sensed during that swiping. In the embodiment, the above mentioned process may be repeated several times, and the selected effective frames from different groups of swiping frames sensed during several times of swiping will be included into the registered fingerprint dataset. In an embodiment of the invention, the prompting information may be configured to inform the user by generating a voice or showing a message on a display unit (not shown in figures).

After all of the registered fingerprint datasets are generated, for verification, the user will be asked to press his or her finger on the fingerprint sensor 110. A pressing fingerprint dataset will be generated accordingly, and transmitted to the processing unit 120. The processing unit 120 will compare the pressing fingerprint dataset with the registered fingerprint datasets. When the pressing fingerprint dataset matches one of the registered fingerprint datasets, the pressing fingerprint dataset will be verified.

Figure 4:
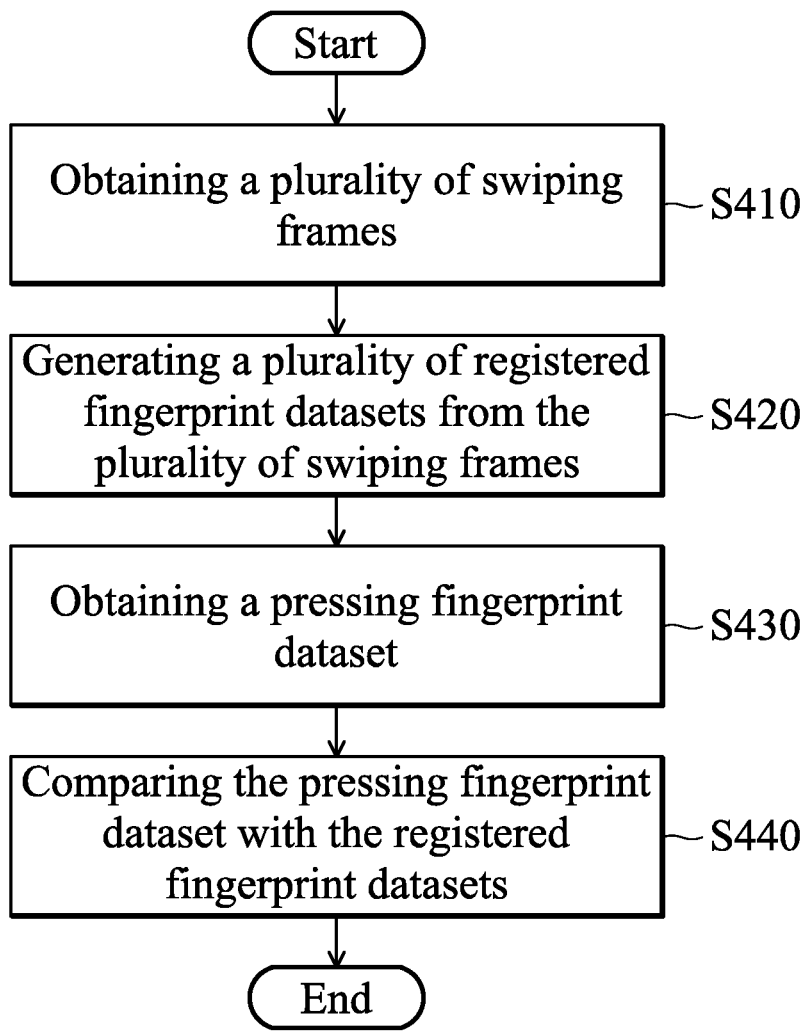
FIG. 4 is a flow chart 400 illustrating the fingerprint recognition method according to an embodiment of the invention.

FIG. 4 is a flow chart 400 illustrating the fingerprint recognition method according to an embodiment of the invention. The fingerprint recognition method is applied to the electronic device 100. As shown in FIG. 4, firstly, in step S410, a plurality of swiping frames are obtained. In step S420, a plurality of registered fingerprint datasets are generated from the plurality of swiping frames. In step S430, a pressing fingerprint dataset is obtained. In step S440, the pressing fingerprint dataset is compared with the registered fingerprint datasets.

Figure 5:
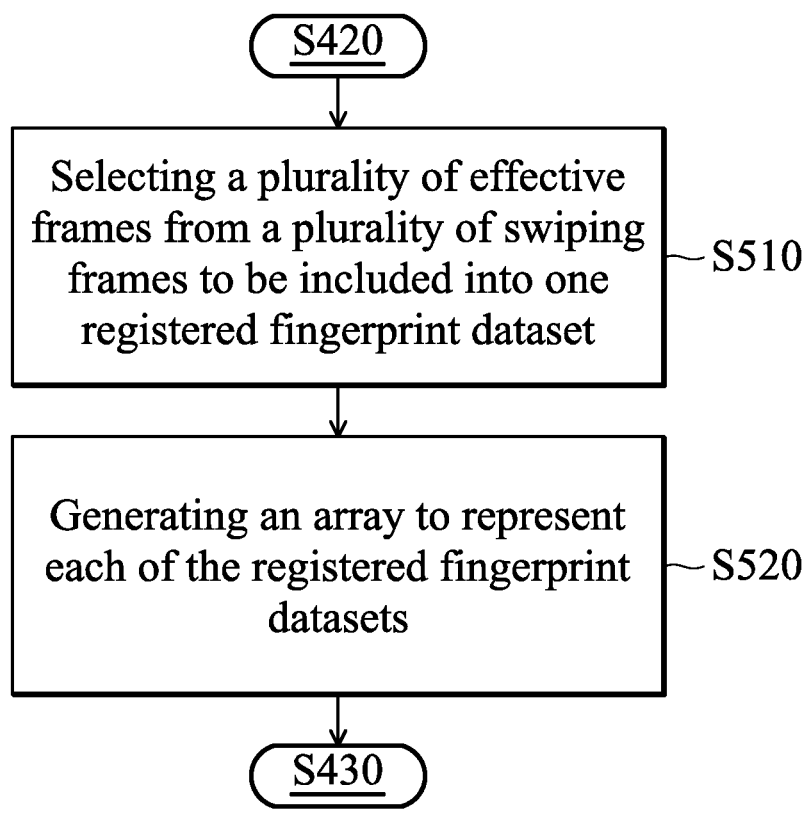
FIG. 5 is a flow chart 500 illustrating step S420 according to an embodiment of the invention.
Figure 6:
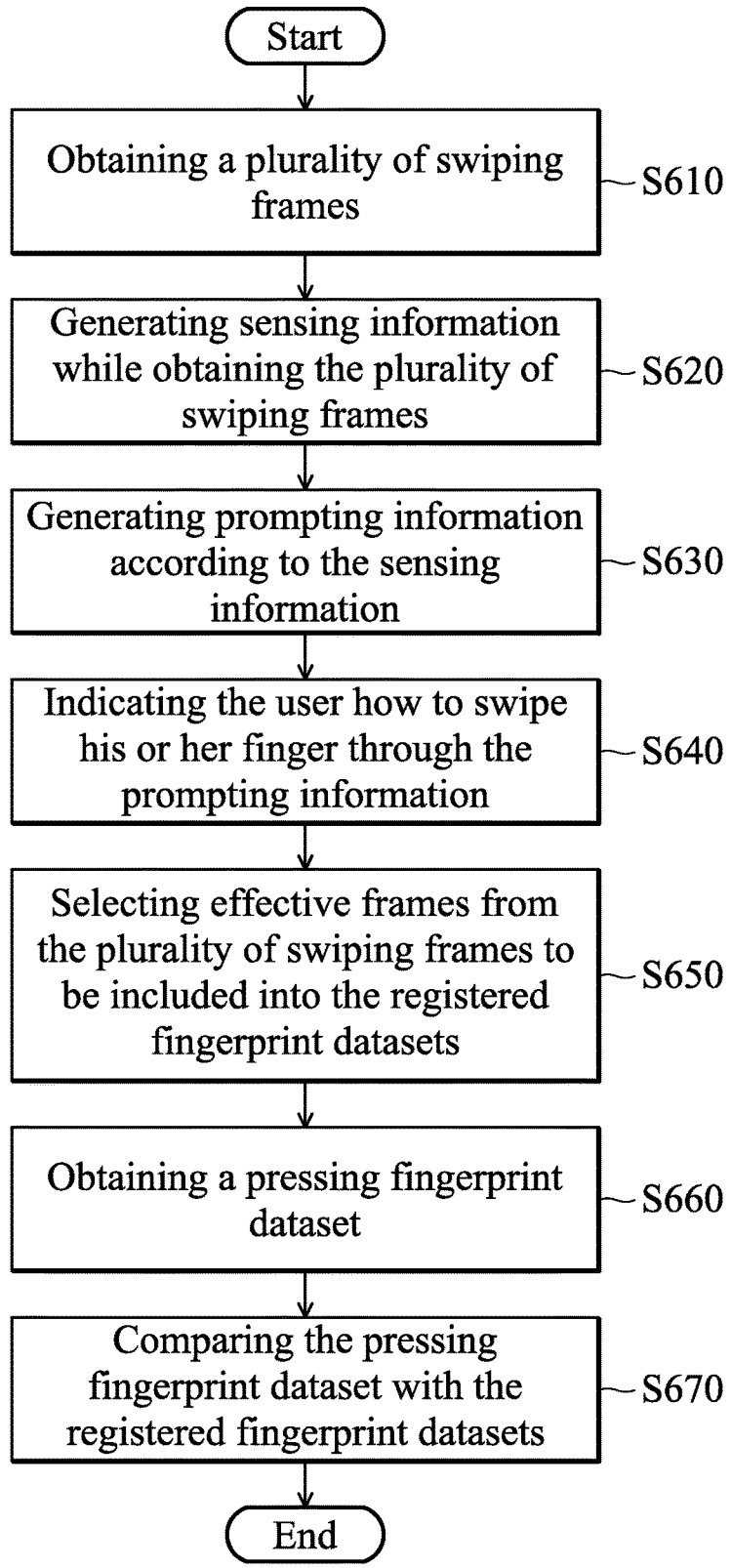
FIG. 6 is a flow chart 600 illustrating the fingerprint recognition method according to another embodiment of the invention.

FIG. 5 is a flow chart 500 illustrating step S420 according to an embodiment of the invention. In an embodiment of the invention, in flow chart 400, each of the registered fingerprint datasets corresponds to a different swiping direction. In the embodiment, step S420 comprises the following steps. In step S510, a plurality of effective frames are selected from a plurality of swiping frames to be included into one registered fingerprint dataset. The plurality of swiping frames are sensed when the user swipes his or her finger over the fingerprint sensor 110 along a particular direction, and that registered fingerprint dataset is corresponding to that particular direction. In step S520, an array is generated to represent each of the registered fingerprint datasets. Each of the arrays comprises the effective frames selected from the plurality of swiping frames sensed when the user swipes his or her finger over the fingerprint sensor 110 along a particular direction, and the array is corresponding to that particular direction. In the embodiment, the effective frames are selected by comparing the minutiae of the swiping frames or by comparing the reference areas of the swiping frames FIG. 6 is a flow chart 600 illustrating the fingerprint recognition method according to another embodiment of the invention. The fingerprint recognition method is applied to the electronic device 100. As shown in FIG. 6, firstly, in step S610, a plurality of swiping frames are obtained. In step S620, sensing information is generated by the electronic device 100 while the plurality of swiping frames are being obtained. In step S630, prompting information is generated according to the sensing information. In step S640, the prompting information is used to indicate the user along which direction or/and at which location to swipe his or her finger over the fingerprint sensor 110. In step S650, a plurality of effective frames are selected from the plurality of swiping frames to be included into the registered fingerprint datasets. In step S660, one pressing fingerprint dataset is obtained. In step S670, the pressing fingerprint dataset is compared with the registered fingerprint datasets.

Compared with the conventional fingerprint recognition method, in the fingerprint recognition method according to the invention, the user can register his or her fingerprint by swiping his or her finger over the fingerprint sensor, and the user can be recognized and verified by pressing his or her finger on the fingerprint sensor. In addition, in the fingerprint recognition method according to another embodiment, there is no need to reconstruct the frames to generate a composite registered fingerprint dataset. Furthermore, the fingerprint recognition method according to another embodiment may avoid storing too much useless fingerprint information. As a result, the efficiency of fingerprint recognition is promoted.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint recognition method, comprising:
obtaining, by a fingerprint sensor, a plurality of sets of swiping frames when a user swipes his or her finger over the fingerprint sensor multiple times along a plurality of different swiping directions, wherein each of the sets of swiping frames corresponds to one of the plurality of different swiping directions;
generating, by a processing unit, a plurality of registered fingerprint datasets according to the plurality of sets of swiping frames, wherein each of the registered fingerprint datasets corresponds to one of the plurality of sets of swiping frames, and wherein the step of generating the plurality of registered fingerprint datasets comprises, by the processing unit, selecting effective frames to be included into each of the registered fingerprint datasets from the corresponding set of swiping frames, and wherein a number of effective frames in each of the registered fingerprint datasets is less than the number of swiping frames in the corresponding set of swiping frames;
storing, by a processing unit, the registered fingerprint datasets in a storage unit;
obtaining, by the fingerprint sensor, a pressing fingerprint frame when the user presses his or her finger on the fingerprint sensor;
generating, by a processing unit, a pressing fingerprint dataset for verification according to the pressing fingerprint frame; and
comparing directly, by the processing unit, the pressing fingerprint dataset with the plurality of registered fingerprint datasets; and verifying, by the processing unit, the pressing fingerprint dataset when the pressing fingerprint dataset matches one of the plurality of registered fingerprint datasets.

2. The fingerprint recognition method of claim 1, wherein the step of selecting the effective frames to be included into each of the registered fingerprint datasets comprises:
comparing minutiae comprised in the swiping frames.

3. The fingerprint recognition method of claim 1, wherein the step of selecting the effective frames to be included into each of the registered fingerprint datasets comprises:
comparing reference areas of the swiping frames.

4. The fingerprint recognition method of claim 1, further comprising:
generating sensing information while obtaining the swiping frames;
generating prompting information according to the sensing information; and
indicating to a user how to swipe his or her finger through the prompting information.

5. The fingerprint recognition method of claim 1, further comprising the step of discarding registered datasets for which the number of effective frames is smaller than a default value.

6. A fingerprint recognition device, comprising:
a fingerprint sensor, configured to sense a plurality of sets of swiping frames when a user swipes his or her finger over the fingerprint sensor multiple times along a plurality of different swiping directions, wherein each of the sets of swiping frames corresponds to one of the plurality of different swiping directions, and sense a pressing fingerprint frame when the user presses his or her finger on the fingerprint sensor;
a storage unit; and
a processing unit, configured to generate a plurality of registered fingerprint datasets according to the sets of swiping frames, wherein each of the registered fingerprint datasets corresponds to one of the plurality of sets of swiping frames, store the registered fingerprint datasets in the storage unit, generate a pressing fingerprint dataset for verification according to the pressing fingerprint frame, compare the pressing fingerprint dataset with the plurality of registered fingerprint datasets directly, and verify the pressing fingerprint dataset when the pressing fingerprint dataset matches one of the plurality of registered fingerprint datasets, wherein the processing unit selects a number of effective frames to be included into each of the registered fingerprint datasets from the corresponding set of swiping frames, and wherein a number of effective frames in each of the registered fingerprint datasets is less than the number of swiping frames in the corresponding set of swiping frames.

7. The fingerprint recognition device of claim 6, wherein the processing unit selects the effective frames by comparing minutiae comprised in the swiping frames.

8. The fingerprint recognition device of claim 6, wherein the processing unit selects the effective frames by comparing reference areas of the swiping frames.

9. The fingerprint recognition device of claim 6, further comprising:
a prompting unit, configured to generate prompting information according to sensing information generated by the processing unit while the fingerprint sensor senses the swiping frames and to use the prompting information to indicate to a user how to swipe his or her finger.

10. The fingerprint recognition device of claim 6, wherein the processing unit discards registered datasets for which the number of effective frames is smaller than a default value.

11. The fingerprint recognition device of claim 6, wherein the processing unit generates an array to represent each of the registered fingerprint datasets according to the selected effective frames included in the registered fingerprint dataset.

* * * * *